United States Patent
Tomita et al.

(10) Patent No.: US 12,529,431 B2
(45) Date of Patent: Jan. 20, 2026

(54) FOOT VALVE ASSEMBLY AND SUBMERGED PUMP SYSTEM

(71) Applicant: NIKKISO CO., LTD., Tokyo (JP)

(72) Inventors: Yasuo Tomita, Tokyo (JP); Motoyasu Ogawa, Tokyo (JP); Masaaki Eguchi, Saitama (JP)

(73) Assignee: NIKKISO CO., LTD., Tokyo (JP)

( * ) Notice: Subject to any disclaimer, the term of this patent is extended or adjusted under 35 U.S.C. 154(b) by 126 days.

(21) Appl. No.: 18/145,895

(22) Filed: Dec. 23, 2022

(65) Prior Publication Data

US 2023/0323967 A1  Oct. 12, 2023

(30) Foreign Application Priority Data

Dec. 27, 2021  (JP) .................................. 2021-213272

(51) Int. Cl.
 *F16K 15/03* (2006.01)
 *F16K 17/04* (2006.01)
 (Continued)

(52) U.S. Cl.
 CPC ............ *F16K 15/035* (2013.01); *F16K 17/04* (2013.01); *F04D 1/06* (2013.01); *F04D 13/08* (2013.01);
 (Continued)

(58) Field of Classification Search
 CPC ...... F16K 15/035; F16K 17/04; F16K 15/148; F04D 29/628; F04D 1/06; F04D 13/08;
 (Continued)

(56) References Cited

U.S. PATENT DOCUMENTS 1,829,704 A * 10/1931 Krause .................... F04D 9/008
                                                415/121.2
3,369,715 A *  2/1968 Carter .................. F04D 29/608
                                                415/199.2
(Continued)

FOREIGN PATENT DOCUMENTS

JP    59-054796 A   3/1984
JP    H5-078992 A   3/1993
JP    2017-132619 A 8/2017

OTHER PUBLICATIONS

Japan office action dated Jul. 29, 2025.

*Primary Examiner* — Charles G Freay
*Assistant Examiner* — Lilya Pekarskaya
(74) *Attorney, Agent, or Firm* — WCF IP

(57) ABSTRACT

A foot valve assembly according to the present invention includes: an adapter attached to a lower opening end of a pump column configured to accommodate a pump configured to be submerged in a handling liquid, the adapter accommodating a suction port of the pump; a disc-shaped valve disc including a flow path defining surface that is located below a lower end surface of the adapter and defines an inflow path allowing the handling liquid to flow into the pump between the surfaces, the valve disc opening and closing a lower opening of the adapter; a biasing member biasing the valve disc toward the adapter; and a one-way valve disposed in the inflow path, the valve opening for fluid discharged from the lower opening depending on a pressure of the fluid and closing for the handling liquid flowing toward the lower opening when the valve disc is closed.

12 Claims, 10 Drawing Sheets

(51) Int. Cl.
  *F04D 1/06* (2006.01)
  *F04D 13/08* (2006.01)
  *F04D 29/08* (2006.01)
  *F04D 29/62* (2006.01)
  *F16K 15/14* (2006.01)
  *F17C 13/04* (2006.01)

(52) U.S. Cl.
  CPC .......... *F04D 29/086* (2013.01); *F04D 29/628* (2013.01); *F16K 15/148* (2013.01); *F17C 13/04* (2013.01)

(58) Field of Classification Search
  CPC ...... F04D 29/007; F04D 29/086; F17C 13/04; F05D 2210/11; F05D 2240/55
  See application file for complete search history.

(56) References Cited

U.S. PATENT DOCUMENTS

| | | | | |
|---|---|---|---|---|
| 3,876,120 | A * | 4/1975 | Haesloop | F04D 29/608 |
| | | | | 222/333 |
| 3,963,381 | A * | 6/1976 | Kohnen | F04D 13/16 |
| | | | | 415/157 |
| 4,080,106 | A * | 3/1978 | Haesloop | F04D 29/086 |
| | | | | 222/333 |
| 2006/0120904 | A1* | 6/2006 | Haesloop | F04D 1/063 |
| | | | | 417/423.1 |
| 2011/0085919 | A1* | 4/2011 | Williams | F04B 49/02 |
| | | | | 417/63 |

* cited by examiner

FOOT VALVE ASSEMBLY AND SUBMERGED PUMP SYSTEM

TECHNICAL FIELD

The present invention relates to a foot valve assembly and a submerged pump system.

BACKGROUND ART

A submerged pump system is used to remove liquefied gas from a storage tank in which the liquefied gas (liquefied natural gas, liquefied ammonia, etc.,) is stored. A pump (submerged pump) is accommodated in a pump column that is provided extending from a ceiling of the storage tank into the liquefied gas and is submerged in the liquefied gas. A lower opening end of the pump column is opened and closed by a foot valve assembly.

In the submerged pump system, the pump is taken out of the storage tank for maintenance, for example. When the pump stops, the pump column is filled with residual liquefied gas and vaporized liquefied gas (vaporized gas). When the head plate is removed in this state, the liquefied gas and the vaporized gas (hereinafter collectively referred to as "residual gas") leak to the outside. Since much of the residual gas is flammable and toxic, the residual gas needs to be removed prior to the removal of the head plate. To remove the residual gas, a technique has been used in which an inert gas such as nitrogen is introduced into the pump column while a valve disc of the foot valve assembly is closed (for example, see JP 2017-132619 A).

The valve disc is biased upward, i.e., in a valve disc-closing direction by a spring and opens under the own weight of the pump when the pump is in operation (for example, see JP 5-78992 U). Accordingly, when the pump is raised, the valve disc is closed by the biasing force of the spring. When an inert gas is introduced into the pump column in this state, the residual gas is returned into the storage tank while slightly opening the valve disc, and the residual gas inside the pump column is removed (purged) by the inert gas.

The biasing force of the spring and the liquid pressure depending on liquid volume (liquid level) of the liquefied gas in the storage tank are applied to the valve disc after the purging in the valve disc-closing direction. As a result, the valve disc is closed and a protruding portion of the valve disc is pressed against an opposing elastic material, and thus the foot valve assembly is sealed. That is, the sealability of the foot valve assembly depends on the biasing force and the liquid pressure. If the biasing force is increased in order to improve the sealability of the foot valve assembly, the valve disc will not open under the own weight of the pump alone, and accordingly, the limit to increase the biasing force exists. In addition, as the liquid volume (the liquid level) of the liquefied gas in the storage tank decreases, the liquid pressure decreases, and the sealability of the foot valve assembly may decrease. As a result, a small amount of liquefied gas may leak into the foot valve assembly (inside the pump column) during maintenance work.

SUMMARY OF INVENTION

Technical Problem

An object of the present invention is to improve the sealability of a foot valve assembly in a submerged pump system.

Solution to Problem

A foot valve assembly according to one aspect of the present invention includes a cylindrical adapter attached to a lower opening end of a cylindrical pump column configured to accommodate a pump configured to be submerged in a handling liquid, the adapter configured to accommodate a suction port of the pump; a disc-shaped valve disc including a flow path defining surface that is located below a lower end surface of the adapter and is configured to define, between the lower end surface and the flow path defining surface, an inflow path that allows the handling liquid to flow into the pump, the valve disc configured to open and close a lower opening of the adapter; a biasing member that biases the valve disc toward the adapter; and a one-way valve disposed in the inflow path, the one-way valve that opens for fluid discharged from the lower opening depending on a pressure of the fluid and closes for the handling liquid flowing toward the lower opening when the valve disc is closed.

A submerged pump system according to one aspect of the present invention includes a pump configured to be submerged in a handling liquid, a cylindrical pump column configured to accommodate the pump, and the aforementioned foot valve assembly.

Advantageous Effects of Invention

The present invention is able to improve the sealability of the foot valve assembly in the submerged pump system.

DESCRIPTION OF EMBODIMENTS

Figure 1:
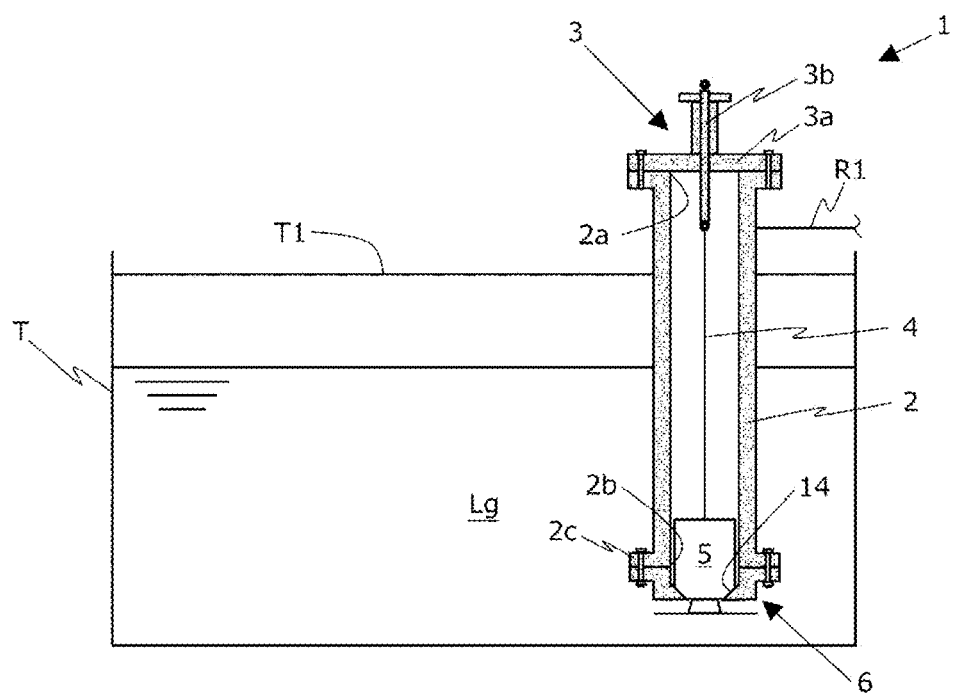
FIG. 1 is a cross-sectional view of a submerged pump system illustrating an embodiment of the submerged pump system according to the present invention.

Embodiments of a submerged pump system and a foot valve assembly according to the present invention will be described below with reference to the drawings. In the drawings, the same members and components are indicated with the same reference signs, and repetitive description thereof will be omitted. In the drawings, a shape and size of each member are intentionally emphasized and illustrated more than the actual dimensions thereof in order to clarify the configuration of each member.

In the following description and drawings, "downward" is the direction of gravity, and "upward" is the opposite direction of downward.

Submerged Pump System (1)

First, an embodiment of the submerged pump system according to the present invention will be described.

Configuration of Submerged Pump System (1)

FIG. 1 is a schematic cross-sectional view of the submerged pump system illustrating the embodiment of the submerged pump system according to the present invention.

A submerged pump system 1 is attached to a storage tank T in which liquefied gas Lg is stored and feeds the liquefied gas Lg from the storage tank T to the outside. The submerged pump system 1 includes a pump column 2, a sealing member 3, a support cable 4, a submerged pump (hereinafter referred to as "pump") 5, and a foot valve assembly 6. In the present embodiment, the liquefied gas Lg is liquefied ammonia. The liquefied ammonia is an example of a handling liquid in the present invention.

Note that, in the present invention, the handling liquid is not limited to the liquefied ammonia. That is, for example, the handling liquid may be liquefied natural gas.

The pump column 2 accommodates the pump 5 and also functions as a liquid feeding path for the liquefied gas Lg discharged from the pump 5. The pump column 2 has a cylindrical shape. The pump column 2 is disposed penetrating a ceiling T1 of the storage tank T and provided extending from the ceiling T1 into the liquefied gas Lg. A liquid feeding path R1 for the liquefied gas Lg is connected to an upper outer peripheral surface of the pump column 2. In a radial direction of the pump column 2, a lower end portion of the pump column 2 protrudes outward and constitutes a lower flange portion 2c.

The sealing member 3 liquid-tightly seals an upper opening end 2a of the pump column 2 and also, when the pump 5 is raised and lowered in the pump column 2, suspends and supports the pump 5 via the support cable 4. The sealing member 3 includes a head plate 3a that covers the upper opening end 2a of the pump column 2 and a lift shaft 3b that is disposed penetrating the head plate 3a. The lift shaft 3b is raised and lowered when the pump 5 is raised and lowered, thereby supporting the pump 5 via the support cable 4.

The support cable 4 suspends and supports the pump 5 when raising and lowering the pump 5 in the pump column 2. The support cable 4 is made of a metal wire, for example. The support cable 4 is connected to the lift shaft 3b and the pump 5.

The pump 5 discharges, into the pump column 2, the liquefied gas Lg flowing in from the foot valve assembly 6. The pump 5 is, for example, a known submerged pump including a multi-stage centrifugal pump and a motor that drives the multi-stage centrifugal pump. The power of the pump 5 is supplied via a power cable (not illustrated) connected to the sealing member 3. The pump 5 is accommodated in a lower portion of the pump column 2 and is submerged in the liquefied gas Lg. The pump 5 is raised and lowered in the pump column 2 between a lowered position and a raised position corresponding to the raising and lowering of the lift shaft 3b.

The "lowered position" is a position where the pump 5 is not raised by the lift shaft 3b and is supported by an inclined surface 14 described later of the foot valve assembly 6. The "raised position" is a position where the pump 5 is suspended (raised) by the lift shaft 3b via the support cable 4 when the lift shaft 3b is raised to a predetermined height.

The foot valve assembly 6 opens and closes a lower opening end 2b of the pump column 2. A specific configuration of the foot valve assembly 6 will be described later.

Configuration of Foot Valve Assembly (1)

Next, the specific configuration of the foot valve assembly 6 (the foot valve assembly according to the present invention) will be described.

Figure 2:
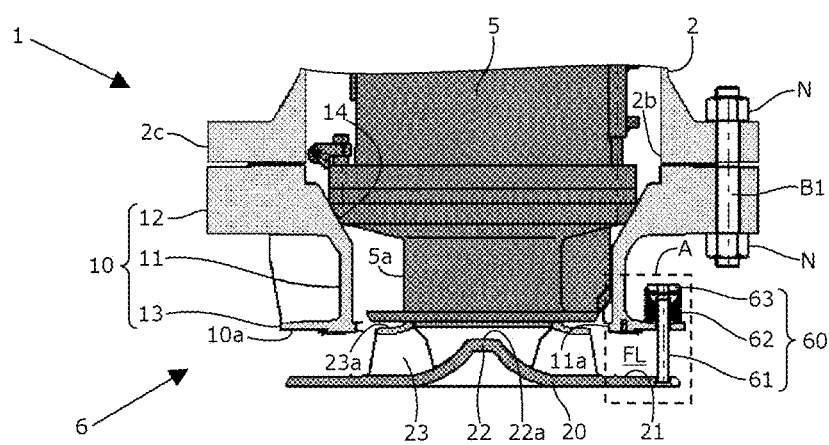
FIG. 2 is a cross-sectional view of a foot valve assembly illustrating an embodiment of the foot valve assembly according to the present invention.

FIG. 2 is a cross-sectional view of the foot valve assembly 6 illustrating the embodiment of the foot valve assembly 6.

Figure 3:
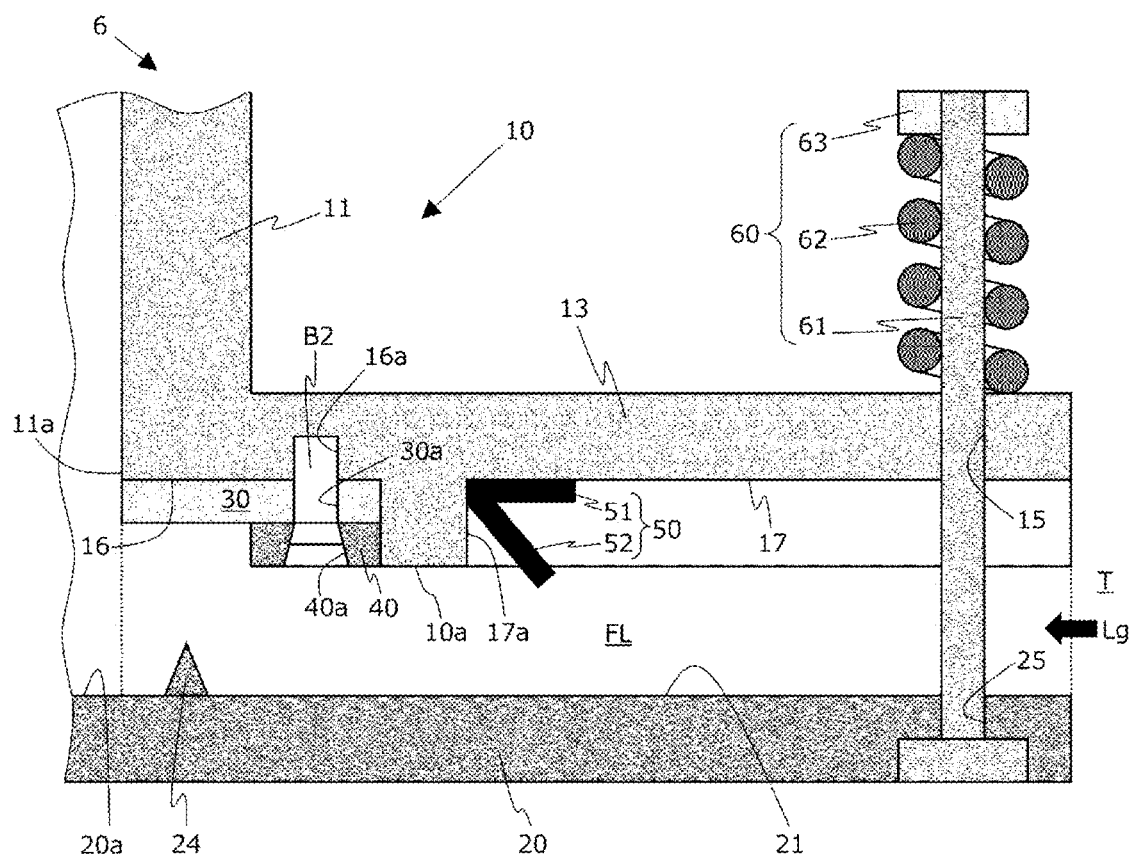
FIG. 3 is a schematic enlarged cross-sectional view of the foot valve assembly enlarging a part A of the foot valve assembly in FIG. 2.

FIG. 3 is a schematic enlarged cross-sectional view of the foot valve assembly 6 enlarging a part A of the foot valve assembly 6 in FIG. 2.

FIG. 2 and FIG. 3 each illustrate the foot valve assembly 6 when the pump 5 is located in the lowered position. FIG. 2 also illustrates lower portions of the pump column 2 and the pump 5 for convenience of description. In the following description, a bolt hole for a first attaching bolt B1 described later is a well-known technique, and the description thereof will be omitted. In the following description, FIG. 1 will be referred to as necessary.

The foot valve assembly 6 includes an adapter 10, a valve disc 20, a sealing member 30, a pressing plate 40, a sealing valve 50, a plurality of biasing units 60, a plurality of first attaching bolts B1, a plurality of second attaching bolts B2, and attaching nuts N.

The adapter 10 is a member that is used to attach the valve disc 20 to the pump column 2 and functions as a housing for the foot valve assembly 6. The adapter 10 includes a cylindrical body portion 11, a first flange portion 12, a second flange portion 13, the inclined surface 14, a plurality of insertion holes 15, a first recess portion 16, and a second recess portion 17.

The cylindrical body portion 11 accommodates a suction port (a suction manifold) 5a, which is disposed at a lower end portion of the pump 5. The cylindrical body portion 11 has a substantially cylindrical shape. In the following description of the adapter 10, the "radial direction" means the radial direction of the cylindrical body portion 11, and the "circumferential direction" means the circumferential direction of the cylindrical body portion 11.

In the radial direction, an upper end portion of the cylindrical body portion 11 protrudes outward and constitutes the ring plate-shaped first flange portion 12. In the radial direction, a lower end portion of the cylindrical body portion 11 protrudes outward and constitutes the ring plate-shaped second flange portion 13. That is, the cylindrical body portion 11 is integrally formed with the first flange portion 12 and the second flange portion 13.

In the vertical direction, an upper half portion of an inner peripheral surface of the cylindrical body portion 11 is continuously expanded from the center to the upper end and constitutes the inclined surface 14.

The insertion hole 15 is a through hole penetrating the second flange portion 13 in the vertical direction. In the circumferential direction, the insertion holes 15 are disposed at equal intervals on an outer edge portion of the second flange portion 13.

An area on an inner edge side of a lower end surface 10a of the adapter 10 (a lower surface of the cylindrical body portion 11 and second flange portion 13, the same applies below) is recessed upward in a ring plate shape and constitutes the first recess portion 16. The first recess portion 16 includes a plurality of internal thread holes 16a. In the circumferential direction, the internal thread holes 16a are disposed at equal intervals in the first recess portion 16.

An area on an outer edge side of the lower end surface 10a of the adapter 10 is recessed upward in a ring plate shape and constitutes the second recess portion 17. The second recess portion 17 includes a side surface 17a located at an inner edge of the second recess portion 17 and extending along the vertical direction. The insertion hole 15 is disposed at an outer edge portion of the second recess portion 17. In the radial direction, the second recess portion 17 is disposed outside the first recess portion 16 and concentrically with the first recess portion 16. The side surface 17a is an example of a movement restricting portion in the present invention.

The first flange portion 12 is fastened to the lower flange portion 2c of the pump column 2 with the first attaching bolt B1 and the attaching nuts N, and thus the adapter 10 is attached to the lower opening end 2b of the pump column 2.

The valve disc 20 opens and closes a lower opening 11a of the cylindrical body portion 11 (i.e., the lower opening of the adapter 10). The valve disc 20 has a disc shape. The diameter of the valve disc 20 is substantially the same as the outer diameter of the second flange portion 13 of the adapter 10. The valve disc 20 includes a flow path defining surface 21, a convex portion 22, a plurality of eddy dissipation plates 23, a protruding portion 24, and a plurality of fitting holes 25. In the following description of the valve disc 20, the "radial direction" means the radial direction of the valve disc 20, and the "circumferential direction" means the circumferential direction of the valve disc 20.

The flow path defining surface 21 is a surface out of an upper surface 20a of the valve disc 20 that is located below the lower end surface 10a of the adapter 10. As described later, the flow path defining surface 21 defines, between the flow path defining surface 21 and the lower end surface 10a, an inflow path FL that allows the liquefied gas Lg to flow toward the pump 5 when the valve disc 20 is open.

A central portion of the valve disc 20 protrudes upward in a substantially conical (mountainous) shape and constitutes the convex portion 22. The convex portion 22 reinforces the valve disc 20 and guides the liquefied gas Lg flowing in from the inflow path FL to the pump 5.

The eddy dissipation plate 23 eliminates or reduces the occurrence of eddy in the liquefied gas Lg flowing in from the inflow path FL. The eddy dissipation plate 23 has a substantially trapezoidal plate shape. The eddy dissipation plate 23 is disposed in an area from the inner side relative to the flow path defining surface 21 to an outer edge portion of the convex portion 22 on the upper surface 20a of the valve disc 20 in such a way that both surfaces of the eddy dissipation plate 23 are along the radial direction. In the circumferential direction, the eddy dissipation plates 23 are disposed at equal intervals. An upper surface 23a of the eddy dissipation plate 23 is located above a top surface 22a of the convex portion 22.

The protruding portion 24 seals the inflow path FL together with the sealing member 30 when the valve disc 20 is closed. In the flow path defining surface 21, a part of the area located below the first recess portion 16 protrudes upward in a ring shape and constitutes the protruding portion 24. In the radial direction, the cross-sectional shape of the protruding portion 24 is an upward convex triangle.

The fitting hole 25 is a through hole penetrating the valve disc 20 in the vertical direction. In the circumferential direction, the fitting holes 25 are disposed at equal intervals at positions facing the insertion holes 15.

The valve disc 20 is attached to the adapter 10 so as to be able to open and close the lower opening 11a of the cylindrical body portion 11 with the biasing unit 60. In this case, the protruding portion 24 is disposed facing the sealing member 30 and protrudes from the flow path defining surface 21 toward the sealing member 30. Details of attaching the valve disc 20 are described later.

The sealing member 30 seals the inflow path FL together with the protruding portion 24 when the valve disc 20 is closed. The sealing member 30 is a ring plate-shaped gasket, for example. The material of the sealing member 30 is a fluorine resin such as polytetrafluoroethylene (PTFE), for example. The sealing member 30 is disposed in the first recess portion 16. The sealing member 30 includes a plurality of insertion holes 30a. In the circumferential direction of the sealing member 30, the insertion holes 30a are disposed at equal intervals at positions facing the internal thread holes 16a. The sealing member 30 is an example of a first sealing member in the present invention.

The pressing plate 40 fixes the sealing member 30 to the first recess portion 16. The pressing plate 40 has a ring plate shape, for example. The pressing plate 40 is disposed in the first recess portion 16. The pressing plate 40 includes a plurality of insertion holes 40a. In the circumferential direction of the pressing plate 40, the insertion holes 40a are disposed at equal intervals at positions facing the insertion holes 30a of the sealing member 30.

The second attaching bolt B2 disposed through the two insertion holes 30a and 40a is screwed into the internal thread hole 16a, and thus the sealing member 30 and the pressing plate 40 are attached to the first recess portion 16. In this case, the sealing member 30 is held between the first recess portion 16 and the pressing plate 40.

The sealing valve 50 functions as a one-way valve that opens for the fluid discharged from the lower opening 11a of the cylindrical body portion 11 depending on the pressure of the fluid and closes for the liquefied gas Lg flowing toward the lower opening 11a when the valve disc 20 is closed. The sealing valve 50 includes a ring-shaped packing, for example. In the present embodiment, the cross-sectional shape of the sealing valve 50 is a "V" shape with two arm portions 51 and 52, but the sealing valve 50 is not limited to a V-shaped packing having such a cross-sectional shape. The material of the sealing valve 50 is rubber, such as ethylene propylene diene monomer (EPDM), for example. That is, the sealing valve 50 is made of a single elastic material. The inner diameter of the sealing valve 50 is slightly smaller than the diameter of the side surface 17a of the second recess portion 17. The length of each of the arm portions 51 and 52 is longer than the depth (the vertical length) of the second recess portion 17.

The sealing valve 50 is attached to the adapter 10 by being fitted into the second recess portion 17. The tips of the arm portions 51 and 52 are directed toward an outer edge side of the adapter 10. That is, the cross-sectional shape of the sealing valve 50 attached to the adapter 10 is a shape like "<" or ">" with the two tips directing toward the outer edge side. Of the arm portions 51 and 52, one arm portion 51 abuts on the second recess portion 17, while the other arm portion 52 is directed diagonally downward. The tip of the arm portion 52 protrudes slightly downward from the second recess portion 17. The arm portion 52 is an example of a deformable portion in the present invention.

The biasing unit 60 is used to attach the valve disc 20 to the adapter 10 and also biases the valve disc 20 toward the adapter 10 side. The biasing unit 60 includes a shaft member 61, a spring 62, and a retainer 63.

The shaft member 61 guides the extension and contraction of the spring 62. The shaft member 61 has a columnar shape along the vertical direction. The shaft member 61 is disposed through the fitting hole 25 of the valve disc 20 and the insertion hole 15 of the adapter 10 from below. A lower portion of the shaft member 61 is fitted into the fitting hole 25. A part of the shaft member 61 protrudes above the second flange portion 13.

The spring 62 extends and contracts along the shaft member 61 and biases the valve disc 20 toward the adapter 10 side. The spring 62 is a coil spring, for example. The spring 62 is disposed above the second flange portion 13. The part of the shaft member 61 that protrudes above the second flange portion 13 is disposed through the spring 62.

The retainer 63 fixes the position of one end portion (upper end portion) of the spring 62 relative to the shaft member 61. The retainer 63 has a ring plate shape, for example. The retainer 63 is attached to an upper end portion of the shaft member 61 with the upper end portion of the spring 62 pressed downward. As a result, the spring 62 is disposed between the retainer 63 and the second flange portion 13. The spring 62 biases the retainer 63 upward, thereby biasing the valve disc 20 upward, i.e., toward the adapter 10 side, via the shaft member 61.

Operation of Foot Valve Assembly (1)

Next, operations of the foot valve assembly 6 will be described. Among the operations of the foot valve assembly 6, the opening and closing operation of the foot valve assembly 6 (i.e., the opening and closing operation of the valve disc 20) is a well-known operation, and the detailed description thereof will be omitted. In the following description, FIG. 1 to FIG. 3 will be referred to as necessary.

In the following description, "upstream side" and "downstream side" of the inflow path FL follow the direction of flow of the liquefied gas Lg in the inflow path FL. That is, for example, when the pump 5 is in operation, the "upstream side" of the inflow path FL means the outer edge side of the valve disc 20 (the outer edge side of the second flange portion 13), and the "downstream side" of the inflow path FL means the center side of the valve disc 20 (the inner edge side of the second flange portion 13).

Operation When Valve Disc Is Open

The foot valve assembly 6 is open with the own weight of the pump 5 resisting the biasing force of the spring 62 (hereinafter simply referred to as "biasing force") when the pump 5 is located in the lowered position. In this case, a lower end surface of the pump 5 abuts on the upper surface 23a of the eddy dissipation plate 23, and a part of the pump 5 abuts on the inclined surface 14.

When the valve disc 20 is open, the inflow path FL is defined between the lower end surface 10a of the adapter 10 and the flow path defining surface 21 of the valve disc 20. As a result, the liquefied gas Lg flows in from the storage tank T into a space between the eddy dissipation plates 23 via the inflow path FL. Then, the liquefied gas Lg is rectified by the eddy dissipation plates 23 and guided by the convex portion 22 to the pump 5.

Herein, the first recess portion 16 and the second recess portion 17 constitute a part of the lower end surface 10a. In other words, the lower end surface 10a includes the first recess portion 16 and the second recess portion 17. Thus, the first recess portion 16 and the second recess portion 17 define a part of the inflow path FL. Accordingly, in the present embodiment, the sealing member 30, the pressing plate 40, and the sealing valve 50 are disposed in the inflow path FL.

The arm portion 52 of the sealing valve 50 is directed toward the outer edge side of the adapter 10 and diagonally downward. Thus, the arm portion 52 is pressed to the downstream side by the liquefied gas Lg flowing in the inflow path FL. As a result, the sealing valve 50 is also pressed to the downstream side. In this case, since the sealing valve 50 is supported by the side surface 17a of the second recess portion 17, the sealing valve 50 does not move to the downstream side. In this way, the side surface 17a functions as the movement restricting portion in the present invention.

Operation When Valve Disc Is Closed

Figure 4:
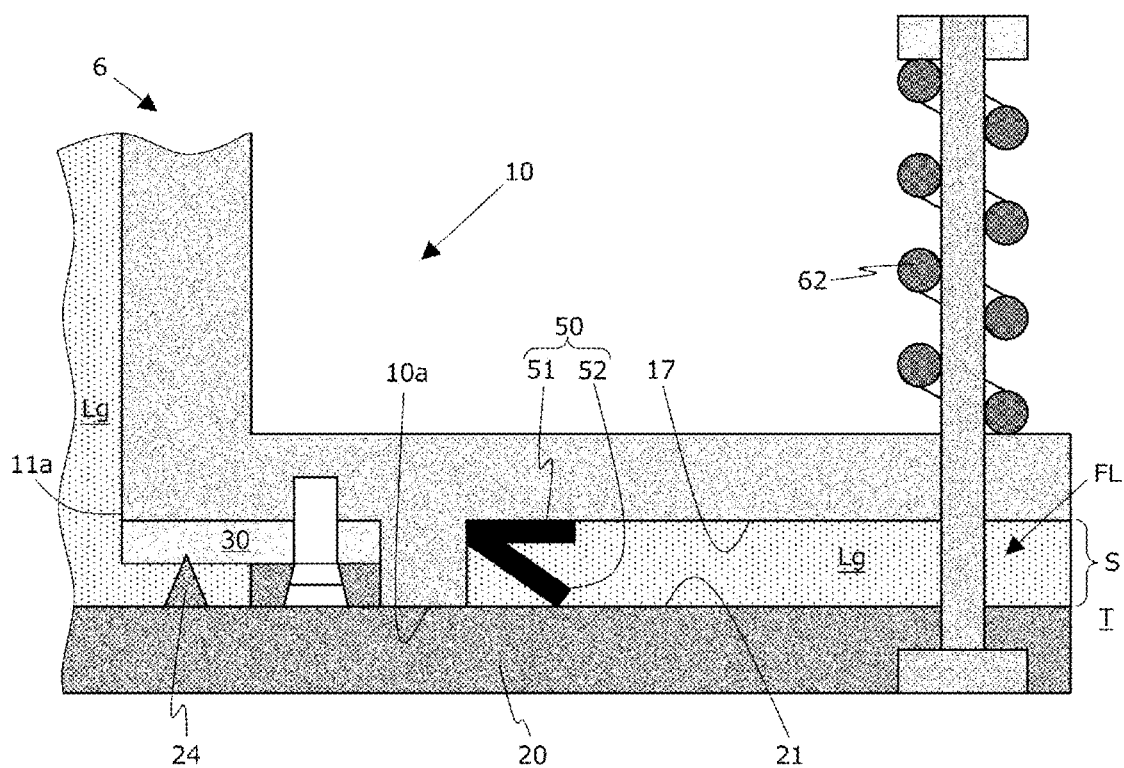
FIG. 4 is a schematic enlarged cross-sectional view of the foot valve assembly with a valve disc closed, the view enlarging the part A in FIG. 2.

FIG. 4 is a schematic enlarged cross-sectional view of the foot valve assembly 6 with the valve disc 20 closed, the view enlarging the part A in FIG. 2.

The foot valve assembly 6 is closed by the biasing force when the lower end surface of the pump 5 is separated from the upper surface 23a of the eddy dissipation plate 23 (for example, when the pump 5 is located in the raised position).

When the valve disc 20 is closed, the protruding portion 24 is pressed against the sealing member 30 by the biasing force. As a result, the protruding portion 24 and the sealing member 30 block the inflow path FL. The flow path defining surface 21 of the valve disc 20 is pressed against the arm portion 52 of the sealing valve 50 by the biasing force depending on the protruding length of the arm portion 52 from the second recess portion 17. Accordingly, the arm portion 51 abuts on the second recess portion 17, and the arm portion 52 abuts on the flow path defining surface 21. As a result, the sealing valve 50 blocks the inflow path FL. The angle formed between the arm portion 52 and the flow path defining surface 21 (hereinafter referred to as "arm angle") is an acute angle on the downstream side of the arm portion 52 and an obtuse angle on the upstream side of the arm portion 52.

In the inflow path FL, a space S with a width equivalent to the depth of the second recess portion 17 is defined between the second recess portion 17 and the flow path defining surface 21. This space S communicates with the inside of the storage tank T. Accordingly, the space S is filled with the liquefied gas Lg in the storage tank T.

Operation from Introduction of Inert Gas to and after End of Introduction

The pump 5 is taken out of the pump column 2 on a regular basis (e.g., every few years), and maintenance for the pump 5 is performed. When the pump 5 is taken out, closing the foot valve assembly 6 and removing (purging) the residual gas (the liquefied gas Lg and the vaporized liquefied gas Lg) in the pump column 2 are required. The removal (purging) of the residual gas is performed by introducing the inert gas into the pump column 2 after the foot valve assembly 6 is closed.

Figure 5:
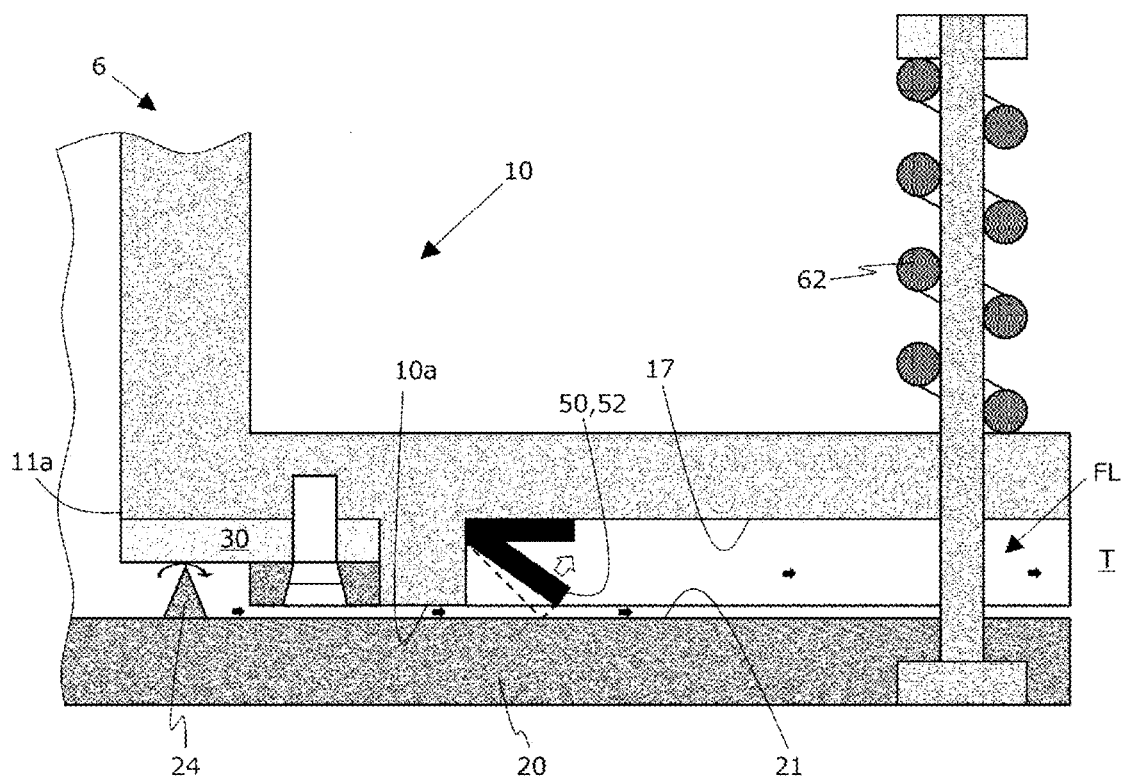
FIG. 5 is a schematic enlarged cross-sectional view of the foot valve assembly in introducing an inert gas, the view enlarging the part A in FIG. 2.

FIG. 5 is a schematic enlarged cross-sectional view of the foot valve assembly 6 in introducing an inert gas, the view enlarging the part A in FIG. 2.

The figure illustrates the flow of the residual gas with black arrows. The figure also illustrates a direction to which the arm portion 52 is deformable with a white arrow.

When the inert gas is introduced into the pump column 2, the residual gas in the pump column 2 is pressed downward by the pressure of the inert gas, and the valve disc 20 opens slightly against the biasing force of the spring 62. As a result, a small gap is generated between an upper end portion of the protruding portion 24 and the sealing member 30, and the residual gas is discharged to the downstream side of the protruding portion 24 through the gap. In this case, the pressing of the arm portion 52 against the flow path defining surface 21 is relaxed. However, the arm portion 52 still abuts on the flow path defining surface 21 as indicated with a dashed line in FIG. 5. Thus, the residual gas discharged to the downstream side of the protruding portion 24 is dammed by the arm portion 52.

The residual gas discharged to the downstream side of the protruding portion 24 applies a pressure directed toward the downstream side to the arm portion 52. As described above, the tip of the arm portion 52 is directed toward the outer edge side of the adapter 10 (i.e., to the upstream side), and the arm angle on the upstream side of the arm portion 52 is acute. Thus, the arm portion 52 is subjected to the pressure directed upward on the downstream side by the residual gas.

Herein, the area above the arm portion 52 is filled with the liquefied gas Lg, and the arm portion 52 resists the pressure almost solely by its own elastic force. Accordingly, when the pressure applied to the arm portion 52 exceeds the elastic force of the arm portion 52, the arm portion 52 is bent (deformed) upward on the downstream side by the pressure. As a result, the residual gas is discharged (purged) to the downstream side of the arm portion 52, that is, into the storage tank T. In this way, the arm portion 52 functions as the deformable portion in the present invention.

Figure 6:
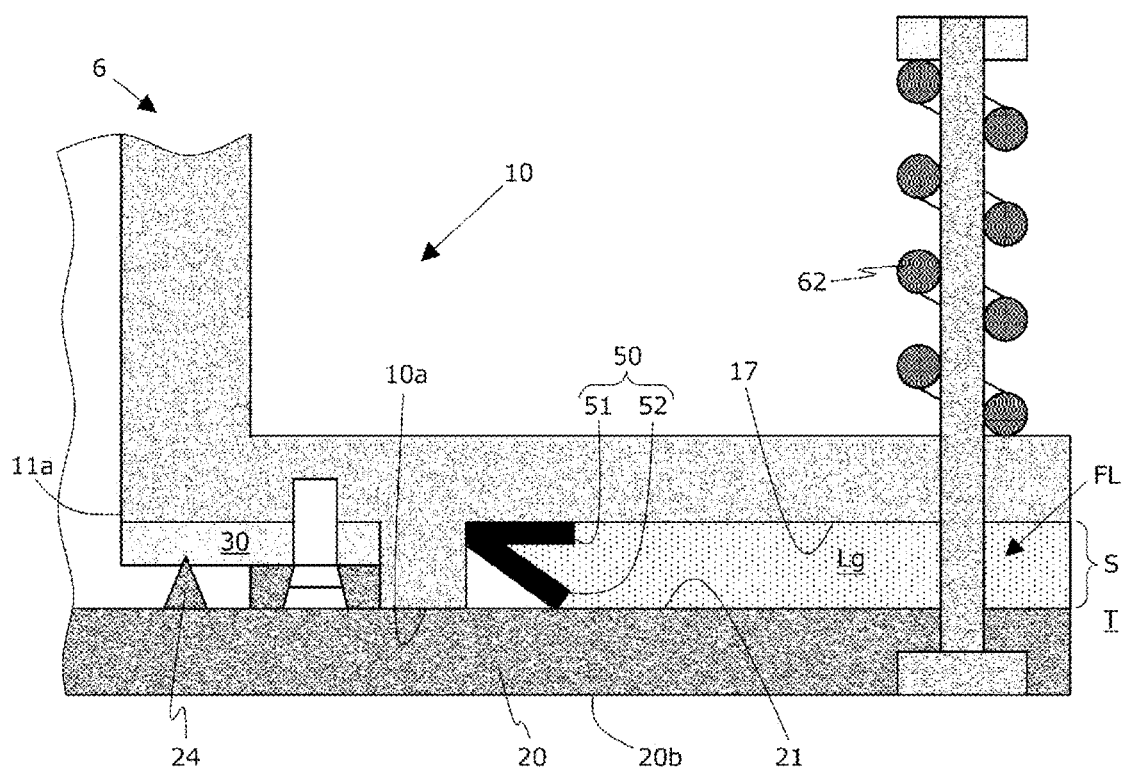
FIG. 6 is a schematic enlarged cross-sectional view of the foot valve assembly after ending the introduction of the inert gas, the view enlarging the part A in FIG. 2.

FIG. 6 is a schematic enlarged cross-sectional view of the foot valve assembly 6 after ending the introduction of the inert gas, the view enlarging the part A in FIG. 2.

When the introduction of the inert gas into the pump column 2 ends (when the residual gas has been purged), the inside of the pump column 2 and the inside of the foot valve assembly 6 are filled with the inert gas. In this case, the liquid pressure is applied to a lower surface 20b of the valve disc 20 depending on liquid volume (liquid level) of the liquefied gas Lg stored in the storage tank T. That is, the valve disc 20 is biased toward the adapter 10 side by the biasing force and the liquid pressure. In this case, the protruding portion 24 is pressed against the sealing member 30 by the biasing force and the liquid pressure.

The liquefied gas Lg reaches the sealing valve 50 through the space S between the second recess portion 17 and the flow path defining surface 21. In this case, the arm portion 52 abuts on the flow path defining surface 21. As described above, the arm angle on the upstream side of the arm portion 52 is obtuse. Thus, the arm portion 52 is subjected to the liquid pressure directed diagonally downward on the downstream side by the liquefied gas Lg. In this case, since the arm portion 52 abuts on the flow path defining surface 21, the arm portion 52 cannot be deformed downward. When the arm portion 52 is pressed to the downstream side, a frictional force is generated at a contact portion between the arm portion 52 and the flow path defining surface 21, and the deformation of the arm portion 52 to the downstream side is inhibited. In this way, the arm portion 52 cannot be deformed downward and to the downstream side, and the inflow path FL is sealed by the sealing valve 50. Due to this structure, the sealability of the sealing valve 50 is substantially independent of the biasing force and depends on the liquid pressure, the elastic force, and the frictional force.

As the liquid volume of the liquefied gas Lg in the storage tank T decreases, the liquid pressure decreases. As a result, the force with which the protruding portion 24 is pressed against the sealing member 30 decreases according to the decrease in the liquid pressure. Even in this case, the protruding portion 24 is pressed against the sealing member 30 mainly by the biasing force. The liquid pressure applied to the arm portion 52 decreases, but the arm portion 52 is still pressed downward on the downstream side and abuts on the flow path defining surface 21. Accordingly, the deformation of the arm portion 52 downward and to the downstream side is inhibited similarly to the state before the liquid volume decreases. As a result, the inflow path FL is sealed by the sealing valve 50 regardless of the liquid volume.

In this way, when the inert gas is introduced, the arm portion 52 opens (is deformed) for the fluid (the residual gas and the inert gas) to be discharged from the lower opening 11a of the cylindrical body portion 11 toward the inflow path FL depending on the pressure of the fluid, and discharges the fluid to the upstream side. In contrast, after the introduction of the inert gas ends, the arm portion 52 closes (is not deformed) for the fluid (the liquefied gas Lg) that tries to flow from the upstream side to the downstream side (the lower opening 11a side) due to the liquid pressure of the fluid. That is, the sealing valve 50 (specifically, the arm portion 52) functions as a one-way valve in the present invention.

The downstream side of the sealing valve 50 is sealed by the protruding portion 24 and the sealing member 30. That is, after the introduction of the inert gas ends, the inflow path FL is doubly sealed by the sealing valve 50, and the combination of the protruding portion 24 and the sealing member 30. In the present embodiment, the handling liquid is liquefied ammonia, and the vaporized gas is ammonia gas that is flammable and highly toxic to a living body. Since the ammonia gas is lighter than the air, the ammonia gas is easily breathed in by a maintenance worker. The foot valve assembly 6 according to the present invention is suitable for handling liquids that are difficult to handle, such as liquefied ammonia, due to the double sealing structure.

Conclusion (1)

According to the embodiment described above, the foot valve assembly 6 includes the adapter 10, the valve disc 20, the spring 62, and the sealing valve 50. The adapter 10 is attached to the lower opening end 2b of the pump column 2. The valve disc 20 is located below the lower end surface 10a of the adapter 10 and opens and closes the lower opening 11a of the cylindrical body portion 11. The valve disc 20 includes the flow path defining surface 21 that defines the inflow path FL between the lower end surface 10a and the flow path defining surface 21. The spring 62 biases the valve disc 20 toward the adapter 10 side. The sealing valve 50 is disposed in the inflow path FL and functions as a one-way valve that opens for the fluid to be discharged from the lower opening 11a depending on the pressure of the fluid and closes for the liquefied gas Lg flowing toward the lower opening 11a when the valve disc 20 is closed. According to this configuration, when the valve disc 20 is closed, the inflow path FL is sealed by the sealing valve 50 that is a one-way valve. Thus, in the foot valve assembly 6, purging of the residual gas with the inert gas is easy, and the sealability after purging is improved compared with a conventional foot valve assembly that is sealed by only the combination of the protruding portion and the elastic material. The sealing valve 50 is opened and closed by the pressure of the fluid applied to the sealing valve 50. That is, the sealing valve 50 is opened and closed without depending on the biasing force. Thus, the sealing valve 50 is able to maintain its sealability regardless of the biasing force. Accordingly, according to the present invention, the sealability of the foot valve assembly 6 in the submerged pump system 1 is improved over the sealability of the conventional foot valve assembly.

According to the embodiment described above, the foot valve assembly 6 includes the ring-shaped sealing member 30 attached to the lower end surface 10a (the first recess portion 16) of the adapter 10. The valve disc 20 includes the protruding portion 24 disposed facing the sealing member 30 and protruding from the flow path defining surface 21 toward the sealing member 30. When the valve disc 20 is closed, the protruding portion 24 is pressed against the sealing member 30 by the biasing force. According to this configuration, when the valve disc 20 is closed, the inflow path FL is doubly sealed by the combination of the protruding portion 24 and the sealing member 30 and by the sealing valve 50. Accordingly, the sealability of the foot valve assembly 6 is improved over the sealability by the sealing with only the combination of the protruding portion 24 and the sealing member 30 or with only the sealing valve 50.

According to the embodiment described above, the sealing valve 50 is disposed outside the protruding portion 24 in the radial direction of the valve disc 20. According to this configuration, in the inflow path FL, the sealing valve 50, which is able to maintain the sealability regardless of the biasing force, is disposed on the upstream side of (outside) the protruding portion 24. Accordingly, in the inflow path FL, the liquefied gas Lg from the storage tank T is blocked by the sealing valve 50 and does not leak to the protruding portion 24. Even if the liquefied gas Lg reaches the downstream side of (inside) the sealing valve 50, the liquefied gas Lg is dammed by the protruding portion 24 and the sealing member 30. In this way, the sealability of the foot valve assembly 6 is improved when the sealing valve 50 independent of the biasing force is disposed on the upstream side of the protruding portion 24 and the sealing member 30 that are dependent on the biasing force and the liquid volume.

According to the embodiment described above, in the radial direction of the valve disc 20, the adapter 10 includes the side surface 17a that restricts the movement of the sealing valve 50. The sealing valve 50 is attached to the second recess portion 17. According to this configuration, in the radial direction of the valve disc 20, the sealing valve 50 is not moved by the fluid flowing in the inflow path FL. Accordingly, the sealing valve 50 is able to stably seal the inflow path FL. As a result, the sealability of the foot valve assembly 6 is stable and improved.

According to the embodiment described above, the sealing valve 50 includes the arm portion 52 that is made of a ring-shaped elastic material and is deformable depending on the pressure of the fluid flowing in the inflow path FL to the upstream side. According to this configuration, the one-way valve can be simply made of a single ring-shaped elastic material such as V-packing, for example. The sealing valve 50 is opened and closed by the pressure applied to the sealing valve 50 and the elastic force of the arm portion 52. That is, the sealability of the sealing valve 50 depends on the pressure and the elastic force, not on the biasing force. Thus, the sealing valve 50 is able to maintain its sealability regardless of the biasing force. Accordingly, the sealability of the foot valve assembly 6 is improved by a simple configuration.

Submerged Pump System (2)

Next, another embodiment (hereinafter referred to as "second embodiment") of the submerged pump system and the foot valve assembly according to the present invention will be described with a focus on differences from the previously described embodiment (hereinafter referred to as "first embodiment"). The second embodiment differs from the first embodiment in that the foot valve assembly includes a second sealing member. In the following description, components in common with the first embodiment are indicated with the same reference signs, FIG. 1 to FIG. 3 will be referred to as necessary, and the description thereof will be omitted.

Configuration of Submerged Pump System (2)

Figure 7:
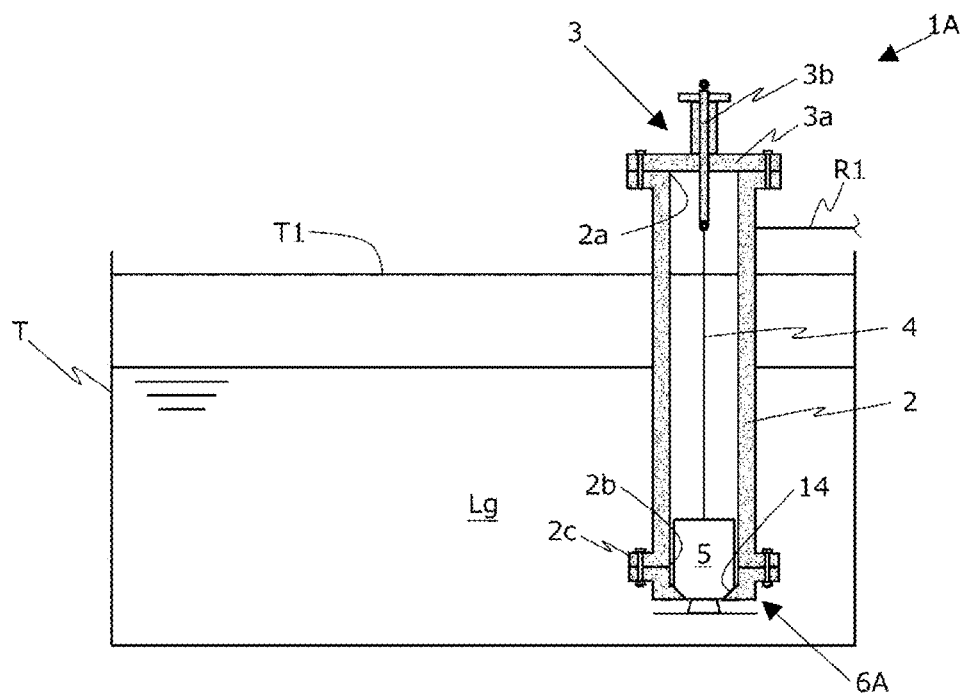
FIG. 7 is a schematic cross-sectional view of the submerged pump system illustrating a second embodiment of the submerged pump system according to the present invention.

FIG. 7 is a schematic cross-sectional view of the submerged pump system illustrating the second embodiment of the submerged pump system according to the present invention.

A submerged pump system 1A is attached to the storage tank T in which the liquefied gas Lg is stored and feeds the liquefied gas Lg from the storage tank T to the outside. The submerged pump system 1A includes the pump column 2, the sealing member 3, the support cable 4, the pump 5, and a foot valve assembly 6A.

Configuration of Foot Valve Assembly (2)

Figure 8:
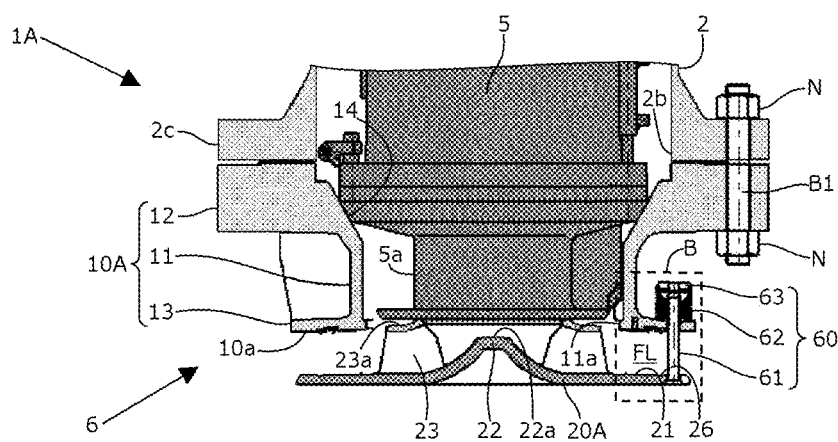
FIG. 8 is a cross-sectional view of the foot valve assembly illustrating the second embodiment of the foot valve assembly according to the present invention.

FIG. 8 is a cross-sectional view of a foot valve assembly 6A illustrating the second embodiment of the foot valve assembly 6A.

Figure 9:
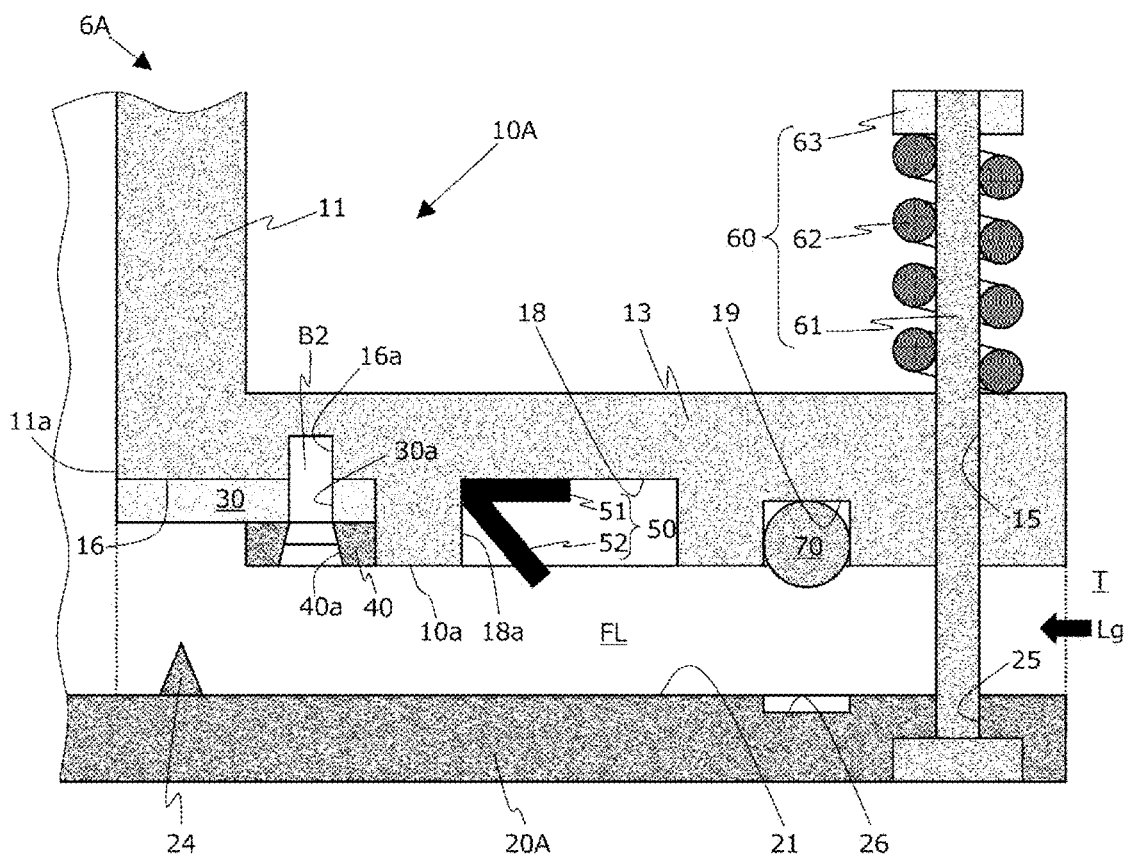
FIG. 9 is a schematic enlarged cross-sectional view of the foot valve assembly enlarging a part B in FIG. 8.

FIG. 9 is a schematic enlarged cross-sectional view of the foot valve assembly 6A enlarging a part B in FIG. 8.

The figure illustrates the foot valve assembly 6A when the pump 5 is located in the lowered position (when a valve disc 56 is open). FIG. 8 also illustrates lower portions of the pump column 2 and the pump 5 for convenience of description. In the following description, FIG. 7 will be referred to as necessary.

The foot valve assembly 6A includes an adapter 54, the valve disc 56, the sealing member (hereinafter referred to as "first sealing member" in the second embodiment) 30, the pressing plate 40, the sealing valve 50, the plurality of biasing units 60, a second sealing member 70, the plurality of first attaching bolts B1, the plurality of second attaching bolts B2, and the attaching nuts N.

The adapter 54 is a member that is used to attach the valve disc 56 to the pump column 2 and functions as a housing for the foot valve assembly 6A. The adapter 54 includes the cylindrical body portion 11, the first flange portion 12, the second flange portion 13, the inclined surface 14, the insertion hole 15, the first recess portion 16, a first seal groove 18, and a second seal groove 19. In the following description of the adapter 54, the "radial direction" means the radial direction of the cylindrical body portion 11, and the "circumferential direction" means the circumferential direction of the cylindrical body portion 11.

The configuration of the lower end surface 10a of the adapter is common to the configuration of the lower end surface 10a in the first embodiment, except that the first seal groove 18 and the second seal groove 19 are disposed in place of the second recess portion 17.

The first seal groove 18 is a ring plate-shaped groove in which the sealing valve 50 is disposed. In the radial direction, the cross-sectional shape of the first seal groove 18 is rectangular. The first seal groove 18 includes a side surface 18a located along the vertical direction at an inner edge of the first seal groove 18. In the radial direction, the first seal groove 18 is disposed concentrically with the first recess portion 16 on the lower end surface 10a of the adapter 54 and outside the first recess portion 16. The depth (the vertical length) of the first seal groove 18 is shorter than the length of each of the arm portions 51 and 52. The side surface 18a is an example of the movement restricting portion in the present invention.

The second seal groove 19 is a ring-shaped groove in which the second sealing member 70 is disposed. In the radial direction, the second seal groove 19 is disposed concentrically with the first recess portion 16 on the lower end surface 10a of the adapter 54 and outside the first seal groove 18.

The adapter 54 is attached to the lower opening end 2b of the pump column 2 by the first attaching bolt B1 and the attaching nuts N in a manner similar to the adapter 10 in the first embodiment.

The valve disc 56 opens and closes the lower opening 11a of the cylindrical body portion 11. The valve disc 56 has a disc shape. The diameter of the valve disc 56 is substantially the same as the outer diameter of the second flange portion 13 of the adapter 54. The valve disc 56 includes the flow path defining surface 21, the convex portion 22, the plurality of eddy dissipation plates 23, the protruding portion 24, the plurality of fitting holes 25, and a recess portion 26. In the following description of the valve disc 56, the "radial direction" means the radial direction of the valve disc 56 and the "circumferential direction" means the circumferential direction of the valve disc 56.

The configuration of the flow path defining surface 21 is common to the configuration of the flow path defining surface 21 in the first embodiment, except that the recess portion 26 is disposed.

The recess portion 26 is a ring-shaped groove on which a lower end portion of the second sealing member 70 abuts when the valve disc 56 is closed. In the radial direction, the cross-sectional shape of the recess portion 26 is rectangular. The recess portion 26 is disposed concentrically with the protruding portion 24 below the second seal groove 19 in the flow path defining surface 21.

The valve disc 56 is attached so as to be able to open and close the lower opening 11a of the cylindrical body portion 11 by the biasing unit 60 in a manner similar to the valve disc 20 in the first embodiment.

When the valve disc 56 is closed, the second sealing member 70 abuts on the lower end surface 10a (the second seal groove 19) of the adapter 54 and the flow path defining surface 21 (the recess portion 26) and blocks the inflow path FL. The second sealing member 70 is a ring-shaped O-ring, for example. That is, the cross-sectional shape of the second sealing member 70 is circular. The material of the second sealing member 70 is rubber such as EPDM. The second sealing member 70 is fitted into the second seal groove 19. The lower end portion of the second sealing member 70 protrudes downward from the second seal groove 19. In the vertical direction, the protruding length of the second sealing member 70 is longer than the length (the depth) of the recess portion 26.

Operation of Foot Valve Assembly (2)

Next, operations of the foot valve assembly 6A will be described with a focus on differences from the operations of the foot valve assembly 6 in the first embodiment. In the following description, FIG. 7 to FIG. 9 will be referred to as necessary. In the following description, "upstream side" and "downstream side" have the same meaning as "upstream side" and "downstream side" in the first embodiment.

Operation When Valve Disc Is Open

When the valve disc 56 is open, the inflow path FL is defined between the lower end surface 10a of the adapter 54 and the flow path defining surface 21 of the valve disc 56.

The sealing valve 50 is pressed to the downstream side by the liquefied gas Lg in the inflow path FL in a manner similar to the first embodiment. In this case, since the sealing valve 50 is supported by the side surface 18a of the first seal groove 18, the sealing valve 50 does not move to the downstream side. In this way, the side surface 18a functions as the movement restricting portion in the present invention.

The lower end portion of the second sealing member 70 protrudes below the second seal groove 19. Thus, the second sealing member 70 is pressed to the downstream side in a manner similar to the sealing valve 50. In the radial direction, the cross-sectional shape of the lower end portion of the second sealing member 70 is semicircular, and the resistance that the liquefied gas Lg flowing in the inflow path FL receives from the second sealing member 70 is smaller than the resistance received from the sealing valve 50. The second sealing member 70 is fitted into the second seal groove 19. Thus, the second sealing member 70 does not move to the downstream side.

Herein, the first recess portion 16, the first seal groove 18, and the second seal groove 19 constitute a part of the lower end surface 10a. In other words, the lower end surface 10a includes the first recess portion 16, the first seal groove 18, and the second seal groove 19. The recess portion 26 constitutes a part of the flow path defining surface 21. In other words, the flow path defining surface 21 includes the recess portion 26. Thus, the first recess portion 16, the first seal groove 18, the second seal groove 19, and the recess portion 26 define a part of the inflow path FL. Accordingly, the first sealing member 30, the pressing plate 40, the sealing valve 50, and the second sealing member 70 are disposed in the inflow path FL.

Operation When Valve Disc Is Closed

Figure 10:
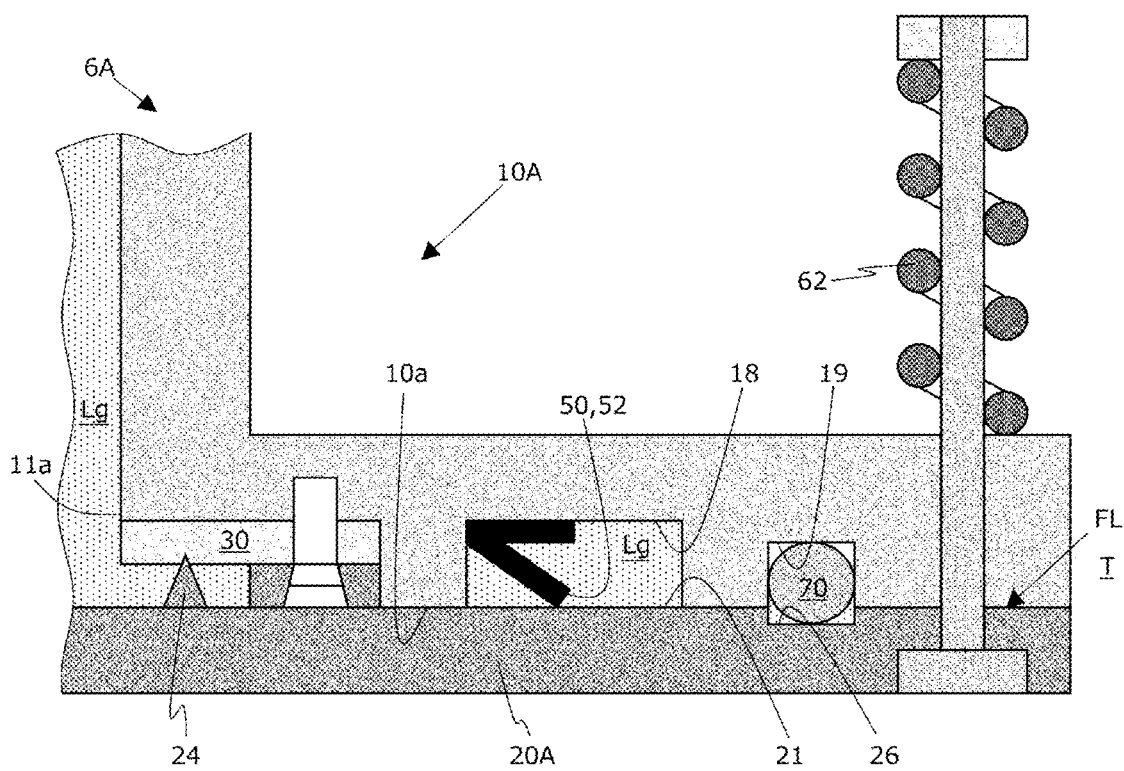
FIG. 10 is a schematic enlarged cross-sectional view of the foot valve assembly with the valve disc closed, the view enlarging the part B in FIG. 8.

FIG. 10 is a schematic enlarged cross-sectional view of the foot valve assembly 6A with the valve disc 56 closed, the view enlarging the part B in FIG. 8.

When the valve disc 56 is closed, the protruding portion 24, the first sealing member 30, and the sealing valve 50 seal the inflow path FL in a manner similar to the first embodiment.

The recess portion 26 of the valve disc 56 is pressed against the lower end portion of the second sealing member 70 by the biasing force. In this case, the second sealing member 70 is compressed (deformed) in the vertical direction by the second seal groove 19 and the recess portion 26 and abuts on the second seal groove 19 and the flow path defining surface 21 (the recess portion 26). As a result, the second sealing member 70 blocks the inflow path FL. Herein, in the vertical direction, the second sealing member 70 is compressed within the range of the second seal groove 19 and the recess portion 26. Thus, at the positions adjacent to the upstream side and the downstream side of the second seal groove 19 (the recess portion 26), the lower end surface 10a and the flow path defining surface 21 abut on each other.

Operation from Introduction of Inert Gas to and after End of Introduction

Figure 11:
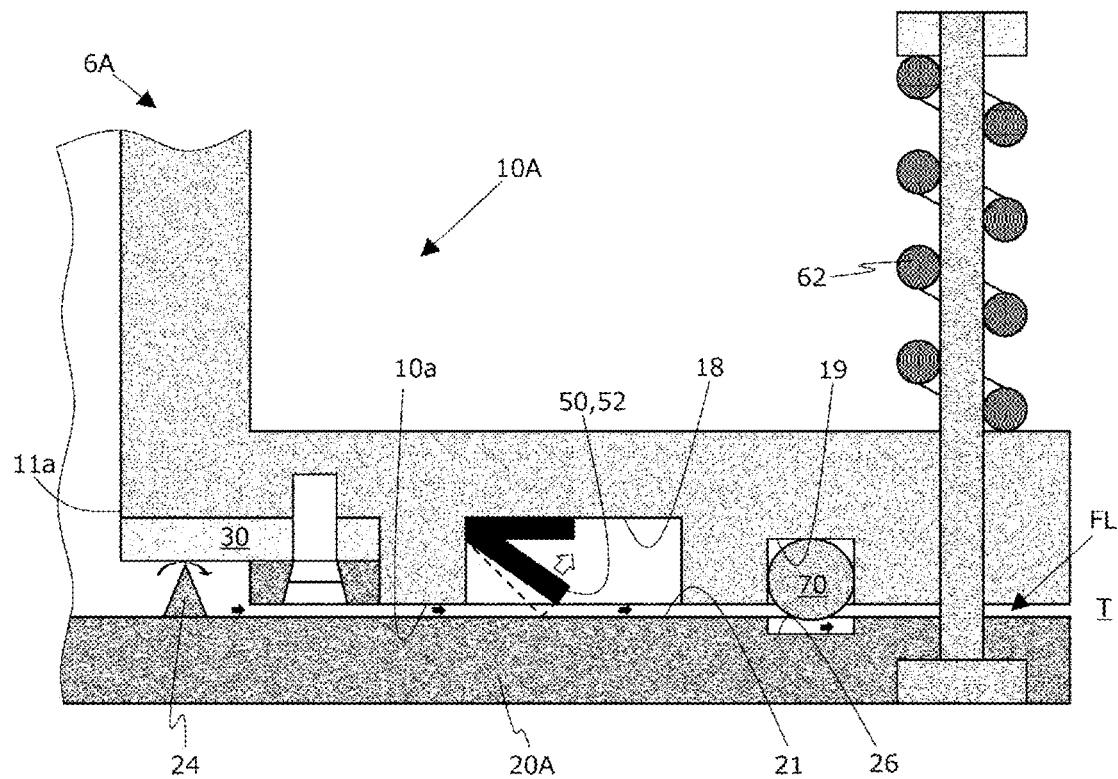
FIG. 11 is a schematic enlarged cross-sectional view of the foot valve assembly in introducing the inert gas, the view enlarging the part B in FIG. 8.

FIG. 11 is a schematic enlarged cross-sectional view of the foot valve assembly 6A in introducing the inert gas, the view enlarging the part B in FIG. 8.

The figure illustrates the flow of the residual gas with black arrows. The figure also illustrates a direction to which the arm portion 52 is deformable with a white arrow.

When the valve disc 56 opens slightly by the pressure of the inert gas, the residual gas is discharged to the downstream side of the sealing valve 50 in a manner similar to the first embodiment. A small gap occurs between the lower end surface 10a and the flow path defining surface 21 and between the second sealing member 70 and the flow path defining surface 21. The residual gas discharged to the downstream side of the arm portion 52 is discharged (purged) through this gap to the downstream side of the second sealing member 70, i.e., to the storage tank T.

Figure 12:
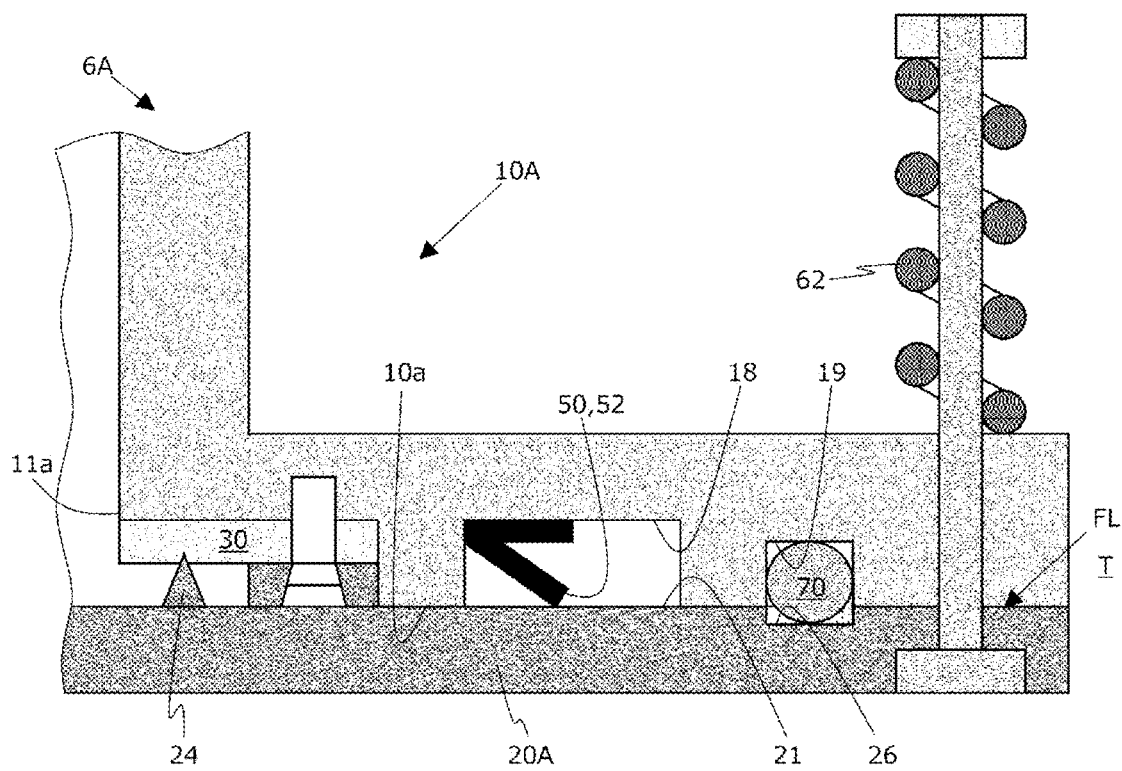
FIG. 12 is a schematic enlarged cross-sectional view of the foot valve assembly after ending the introduction of the inert gas, the view enlarging the part B in FIG. 8.

FIG. 12 is a schematic enlarged cross-sectional view of the foot valve assembly 6A after ending the introduction of the inert gas, the view enlarging the part B in FIG. 8.

When the introduction of the inert gas into the pump column 2 ends (when the residual gas has been purged), the valve disc 56 is biased toward the adapter 54 side by the biasing force and the liquid pressure. In this case, due to the biasing force and the liquid pressure, the protruding portion 24 is pressed against the first sealing member 30, the recess portion 26 is pressed against the second sealing member 70, and the lower end surface 10a abuts on the flow path defining surface 21. The arm portion 52 abuts on the flow path defining surface 21. In this case, the inflow path FL is sealed by the second sealing member 70.

As the liquid volume of the liquefied gas Lg in the storage tank T decreases, the liquid pressure decreases. As a result, the force with which the protruding portion 24 is pressed against the sealing member 30 and the force with which the recess portion 26 is pressed against the second sealing member 70 decrease according to the decrease in the liquid pressure. Even in this case, mainly due to the biasing force, the protruding portion 24 is pressed against the sealing member 30, the recess portion 26 is pressed against the second sealing member 70, and the lower end surface 10a abuts on the flow path defining surface 21.

Herein, as the liquid pressure decreases, the liquefied gas Lg may flow into between the lower end surface 10a and the flow path defining surface 21 and between the recess portion 26 and the second sealing member 70. As a result, the liquefied gas Lg may reach the downstream side of the second sealing member 70. However, the downstream side of the second sealing member 70 is sealed by the sealing valve 50 in a manner similar to the first embodiment. Thus, the liquefied gas Lg does not leak to the downstream side from the sealing valve 50.

In this way, the sealing valve 50 functions as a one-way valve in a manner similar to the first embodiment. After the introduction of the inert gas ends, the inflow path FL is triply sealed by the second sealing member 70, the sealing valve 50, and the combination of the protruding portion 24 and the first sealing member 30. The foot valve assembly 6A according to the present invention is even more suitable for handling liquids that are difficult to handle, such as liquefied ammonia, due to the triple sealing structure.

Conclusion (2)

According to the embodiment described above, the foot valve assembly 6A includes the configuration common to the foot valve assembly 6 in the first embodiment. Thus, the foot valve assembly 6A has the effect similar to that of the foot valve assembly 6 in the first embodiment.

According to the embodiment described above, when the valve disc 56 is closed, the foot valve assembly 6A includes the second sealing member 70 that abuts on the lower end surface 10a of the adapter 54 and the flow path defining surface 21. According to this configuration, when the valve disc 56 is closed, the inflow path FL is triply sealed by the combination of the protruding portion 24 and the first sealing member 30, the sealing valve 50, and the second sealing member 70. Accordingly, the sealability of the foot valve assembly 6A is further improved over that of the sealing with only the combination of the protruding portion 24 and the first sealing member 30, with only the sealing valve 50, or with the sealing valve 50 and the combination of the protruding portion 24 and the first sealing member 30.

According to the embodiment described above, the second sealing member 70 is disposed outside (on the upstream side of) the sealing valve 50 in the radial direction of the adapter 54. According to this configuration, the inflow path FL is sealed on the upstream side by the second sealing member 70 of which sealability depends on the biasing force and the liquid pressure. Even if the sealability of the second sealing member 70 deteriorates due to the decrease in the liquid pressure and the liquefied gas Lg reaches the downstream side of the second sealing member 70, the inflow path FL is sealed by the sealing valve 50 that is independent of the biasing force. In this way, the inflow path FL is sealed by the second sealing member 70 when the biasing force and the liquid pressure are sufficient, and the inflow path FL is sealed by the sealing valve 50 that is independent of the biasing force when the biasing force and the liquid pressure decrease. As a result, the sealability of the foot valve assembly 6A is improved.

According to the embodiment described above, the second sealing member 70 is attached to the second seal groove 19 of the adapter 54. The valve disc 56 includes the recess portion 26 on which the second sealing member 70 abuts when the valve disc 56 is closed. According to this configuration, the second sealing member 70 is compressed in the recess portion 26, and thus the lower end surface 10a of the adapter 54 can abut on the flow path defining surface 21 at positions adjacent to the upstream side and the downstream side of the recess portion 26. As a result, the sealability of the foot valve assembly 6A is improved over that in the state where the gap occurs between the lower end surface 10a and the flow path defining surface 21.

OTHER EMBODIMENTS

In the embodiments described above, the sealing valve 50 may be attached to the valve disc 20, 56. In this case, for example, the outer edge portion of the flow path defining surface 21 of the valve disc 20, 56 may be recessed in a ring plate shape, and a recess portion corresponding to the second recess portion 17 in each embodiment may be formed.

In the second embodiment described above, the second sealing member 70 may be attached to the valve disc 56. In this case, for example, the recess portion 26 of the valve disc 56 may be formed in such a way that the second sealing member 70 is fitted thereinto. In this case, when the valve disc 56 is closed, the second sealing member 70 may abut on the lower end surface 10a (the second seal groove 19) of the adapter 54.

In the embodiments described above, the foot valve assembly 6, 6A need not include the protruding portion 24 and the sealing member 30 (the first sealing member 30). That is, for example, when the valve disc 56 is closed, the foot valve assembly 6, 6A may be sealed by only the sealing valve 50 or by the sealing valve 50 and the second sealing member 70.

In the embodiments described above, the cross-sectional shape of the top of the protruding portion 24 is not limited to the illustrated shape (the pointed shape). That is, for example, the cross-sectional shape thereof may be semicircular or flat.

In the first embodiment described above, the second recess portion 17 may be a ring-shaped groove. In this case, when the valve disc 20 is closed, the lower end surface 10a of the adapter 10 may abut on the flow path defining surface 21 on the upstream side and the downstream side of the second recess portion 17.

In the embodiments described above, the valve disc 20, 56 may include a recess portion configured to abut on the deformed arm portion 52 at a position facing the sealing valve 50.

In the embodiments described above, the sealing valve 50 may be disposed on the downstream side of the protruding portion 24 in the inflow path FL.

In the second embodiment described above, the sealing valve 50 may be disposed on the upstream side of (outside) the second sealing member 70 in the inflow path FL. In this case, the first seal groove 18 may be formed in such a way that the outer edge portion of the lower end surface 10a of the adapter 54 is recessed in a ring plate shape.

In the embodiments described above, the cross-sectional shape of the tip of the arm portion 52 is not limited to the illustrated shape (rectangular shape). That is, for example, the cross-sectional shape thereof may be tapered so that the area in contact with the flow path defining surface 21 is increased.

In the second embodiment described above, the valve disc 56 need not include the recess portion 26. In this case, the second sealing member 70 may abut on the flow path defining surface 21, and a gap may occur between the lower end surface 10a of the adapter 54 and the flow path defining surface 21 on the upstream side and the downstream side of the second sealing member 70.

In the embodiments described above, the second recess portion 17 (the first seal groove 18) may be contiguous to the first recess portion 16. That is, for example, a portion on the upstream side (outer side) of the first recess portion 16 may function as the second recess portion 17 (the first seal groove 18). In this case, the sealing valve 50 may be disposed abutting on a side surface on the upstream side (outer side) of the pressing plate 40, and thus the pressing plate 40 may function as the movement restricting portion.

In the embodiments described above, the cross-sectional shape of the sealing valve 50 is not limited to the V shape. That is, for example, the cross-sectional shape of the sealing valve 50 may be a Y shape or a C shape. For example, the sealing valve 50 may include a main body portion having a rectangular cross-sectional shape and a cut piece (arm portion) extending from the main body portion.

In the embodiments described above, the cross-sectional shape of the sealing valve 50 may be an I shape or an L shape. In this case, the flow path defining surface 21 may include, at a position facing the sealing valve 50, a recess portion that inhibits the deformation of the arm portion of the sealing valve 50 (portion extending in the vertical direction) to the downstream side.

In the embodiments described above, the material of the sealing valve 50 may be any material that functions as a sealing material against the handling liquid and is not limited to EPDM. That is, for example, the material of the sealing valve 50 may be fluorine resin.

In the second embodiment described above, the material of the second sealing member 70 may be any material that functions as a sealing material against the handling liquid and is not limited to EPDM. That is, for example, the material of the second sealing member 70 may be fluorine resin.

In the embodiments described above, the material of the sealing member 30 may be any material that functions as a sealing material against the handling liquid and is not limited to PTFE.

In the embodiments described above, the arm portion 52 of the sealing valve 50 need not protrude downward from the second recess portion 17 (the first seal groove 18). In this case, the arm portion 52 does not abut on the flow path defining surface 21 when the valve disc 20 is closed and while the inert gas is introduced, but the arm portion 52 may be raised up to the downstream side by the liquefied gas Lg and abut on the flow path defining surface 21 after the introduction of the inert gas ends.

Aspects of the Present Invention

Next, aspects of the present invention conceived from the embodiments described above will be described below with reference to the terms and reference signs described in the embodiments.

A first aspect of the present invention is a foot valve assembly (e.g., the foot valve assembly 6, 6A) including: a cylindrical adapter (e.g., the adapter 10, 54) attached to a lower opening end (e.g., the lower opening end 2b) of a cylindrical pump column (e.g., the pump column 2) configured to accommodate a pump (e.g., the pump 5) configured to be submerged in a handling liquid (e.g., the liquefied gas Lg), the adapter configured to accommodate a suction port (e.g., the suction port 5a) of the pump; a disc-shaped valve disc (e.g., the valve disc 20, 56) including a flow path defining surface (e.g., the flow path defining surface 21) that is located below a lower end surface (e.g., the lower end surface 10a) of the adapter and is configured to define, between the lower end surface and the flow path defining surface, an inflow path (e.g., the inflow path FL) that allows the handling liquid to flow into the pump, the valve disc configured to open and close a lower opening (e.g., the lower opening 11a) of the adapter; a biasing member (e.g., the spring 62) that biases the valve disc toward the adapter; and a one-way valve (e.g., the sealing valve 50) disposed in the inflow path, the one-way valve that opens for fluid discharged from the lower opening depending on a pressure of the fluid and closes for the handling liquid flowing toward the lower opening when the valve disc is closed.

According to this configuration, in the submerged pump system, the sealability of the foot valve assembly is improved over the sealability of the conventional foot valve assembly.

A second aspect of the present invention is the foot valve assembly in the first aspect, further including a ring-shaped first sealing member (e.g., the (first) sealing member 30) attached to the lower end surface of the adapter, in which the valve disc includes a ring-shaped protruding portion (e.g., the protruding portion 24) disposed facing the first sealing member, the protruding portion protruding toward the first sealing member from the flow path defining surface, and the protruding portion is pressed against the first sealing member by a biasing force of the biasing member when the valve disc is closed.

According to this configuration, the inflow path is doubly sealed. Accordingly, the sealability of the foot valve assembly is improved over that by the sealing with only the combination of the protruding portion and the sealing member or with only the sealing valve.

A third aspect of the present invention is the foot valve assembly in the second aspect, in which the one-way valve is disposed outside the protruding portion in a radial direction of the valve disc.

According to this configuration, the sealing valve that is independent of the biasing force is disposed on the upstream side of (outside) the protruding portion and the sealing member that are dependent on the biasing force, and thus the sealability of the foot valve assembly is improved.

A fourth aspect of the present invention is the foot valve assembly in any one of the first to the third aspects, in which the one-way valve is attached to any one of the adapter or the valve disc, and the adapter or the valve disc on which the one-way valve is attached includes a movement restricting portion (e.g., the side surface 17a, 18a) that restricts movement of the one-way valve in a radial direction of the valve disc.

According to this configuration, the sealing valve is able to stably seal the inflow path. As a result, the sealability of the foot valve assembly is stable and improved.

A fifth aspect of the present invention is the foot valve assembly in any one of the first to the fourth aspects, in which the one-way valve includes a ring-shaped elastic material and includes a deformable portion (e.g., the arm portion 52) configured to be deformed depending on the pressure of the fluid.

According to this configuration, the sealability of the foot valve assembly is improved by a simple configuration.

A sixth aspect of the present invention is the foot valve assembly (e.g., the foot valve assembly 6A) in any one of the first to the fifth aspects, further including an annular second sealing member (e.g., the second sealing member 70) that abuts on the lower end surface and the flow path defining surface when the valve disc (e.g., the valve disc 56) is closed.

According to this configuration, the sealability of the foot valve assembly is further improved over that by the sealing with only the combination of the protruding portion and the first sealing member, with only the sealing valve, or with the sealing valve and the combination of the protruding portion and the first sealing member.

A seventh aspect of the present invention is the foot valve assembly in the sixth aspect, in which the second sealing member is disposed outside the one-way valve in the inflow path in a radial direction of the adapter.

According to this configuration, the sealability of the foot valve assembly is improved.

An eighth aspect of the present invention is the foot valve assembly in the sixth or the seventh aspect, in which the second sealing member is attached to any one of the adapter or the valve disc, and at least one of the adapter and the valve disc includes a recess portion (e.g., the recess portion 26) on which the second sealing member abuts when the valve disc is closed.

According to this configuration, the sealability of the foot valve assembly is improved over that in the state where a gap occurs between the lower end surface and the flow path defining surface.

A ninth aspect of the present invention is a submerged pump system including a pump configured to be submerged in a handling liquid, a cylindrical pump column configured to accommodate the pump, and the foot valve assembly according to any one of the first to the eighth aspects.

According to this configuration, in the submerged pump system, the sealability of the foot valve assembly is improved over the sealability of the conventional foot valve assembly.

What is claimed is:

1. A foot valve assembly comprising:
    a cylindrical adapter configured to be attached to a lower opening end of a cylindrical pump column configured to accommodate a pump configured to be submerged in a handling liquid, the cylindrical adapter configured to accommodate a suction port of the pump;
    a valve disc including a flow path defining surface that is located below a lower end surface of the cylindrical adapter and is configured to define, between the lower end surface of the cylindrical adapter and the flow path defining surface, an inflow path that allows the handling liquid to flow into the pump, the valve disc configured to open and close a lower opening of the cylindrical adapter;
    a biasing member that biases the valve disc toward the cylindrical adapter; and
    a one-way valve disposed in the inflow path, wherein:
    the one-way valve is configured to open the inflow path, when the valve disc is closed, in response to a pressure of a fluid discharged from the lower opening of the cylindrical adapter, to allow flow of the discharged fluid in a flow direction away from the lower opening of the cylindrical adapter, and
    the one-way valve is further configured to close the inflow path and to seal against flow of the handling liquid toward the lower opening of the cylindrical adapter.

2. The foot valve assembly according to claim 1, further comprising a ring-shaped first sealing member attached to the lower end surface of the cylindrical adapter; wherein
    the valve disc includes a ring-shaped protruding portion disposed facing the ring-shaped first sealing member, the ring-shaped protruding portion protruding toward the ring-shaped first sealing member from the flow path defining surface, and
    the ring-shaped protruding portion is pressed against the ring-shaped first sealing member by a biasing force of the biasing member when the valve disc is closed.

3. The foot valve assembly according to claim 2, wherein the one-way valve is disposed outside the ring-shaped protruding portion in a radial direction of the valve disc.

4. The foot valve assembly according to claim 1, wherein
    the one-way valve is attached to any one of the cylindrical adapter or the valve disc,
    the one-way valve comprises a deformable portion that deforms in response to the pressure of the fluid discharged from the lower opening of the cylindrical adapter, and
    the cylindrical adapter or the valve disc on which the one-way valve is attached includes a movement restricting portion that restricts movement of the one-way valve in a radial direction of the valve disc.

5. The foot valve assembly according to claim 1, wherein the one-way valve includes a ring-shaped elastic material and includes a deformable portion configured to be deformed in response to the pressure of the fluid discharged from the lower opening of the cylindrical adapter.

6. The foot valve assembly according to claim 2, further comprising an annular second sealing member that abuts on the lower end surface of the cylindrical adapter and the flow path defining surface when the valve disc is closed.

7. The foot valve assembly according to claim 6, wherein the annular second sealing member is disposed outside the one-way valve in the inflow path in a radial direction of the cylindrical adapter.

8. The foot valve assembly according to claim 6, wherein
    the annular second sealing member is attached to any one of the cylindrical adapter or the valve disc, and
    at least one of the cylindrical adapter and the valve disc includes a recess portion on which the annular second sealing member abuts when the valve disc is closed.

9. A submerged pump system comprising:
    the pump configured to be submerged in the handling liquid;
    the cylindrical pump column configured to accommodate the pump; and
    the foot valve assembly according to claim 1.

10. The foot valve assembly according to claim 1, wherein
the one-way valve is composed solely of a ring-shaped elastic material and includes a deformable portion configured to be deformed in response to the pressure of the fluid discharged from the lower opening of the cylindrical adapter.

11. The foot valve assembly according to claim 2, wherein,
when the valve disc is closed and purge gas is introduced into the cylindrical pump column,
a gap through which the purge gas flows is defined between the ring-shaped protruding portion and the ring-shaped first sealing member, and
the one-way valve is configured to be opened by a deformable portion that is being deformed in response to a pressure of the purge gas, and,
when the valve disc is closed and an introduction of the purge gas is completed,
the ring-shaped protruding portion is pressed against the ring-shaped first sealing member, and
the one-way valve is configured to be closed by the deformable portion returning to an undeformed state.

12. The foot valve assembly according to claim 3, wherein
the flow path defining surface is a part of an upper surface of the valve disc and is located below the lower end surface of the cylindrical adapter, and
when the valve disc is opened, the inflow path is configured to be defined between the lower end surface of the cylindrical adapter and the flow path defining surface, and
the ring-shaped first sealing member is disposed in the inflow path.

* * * * *